Figure 1:
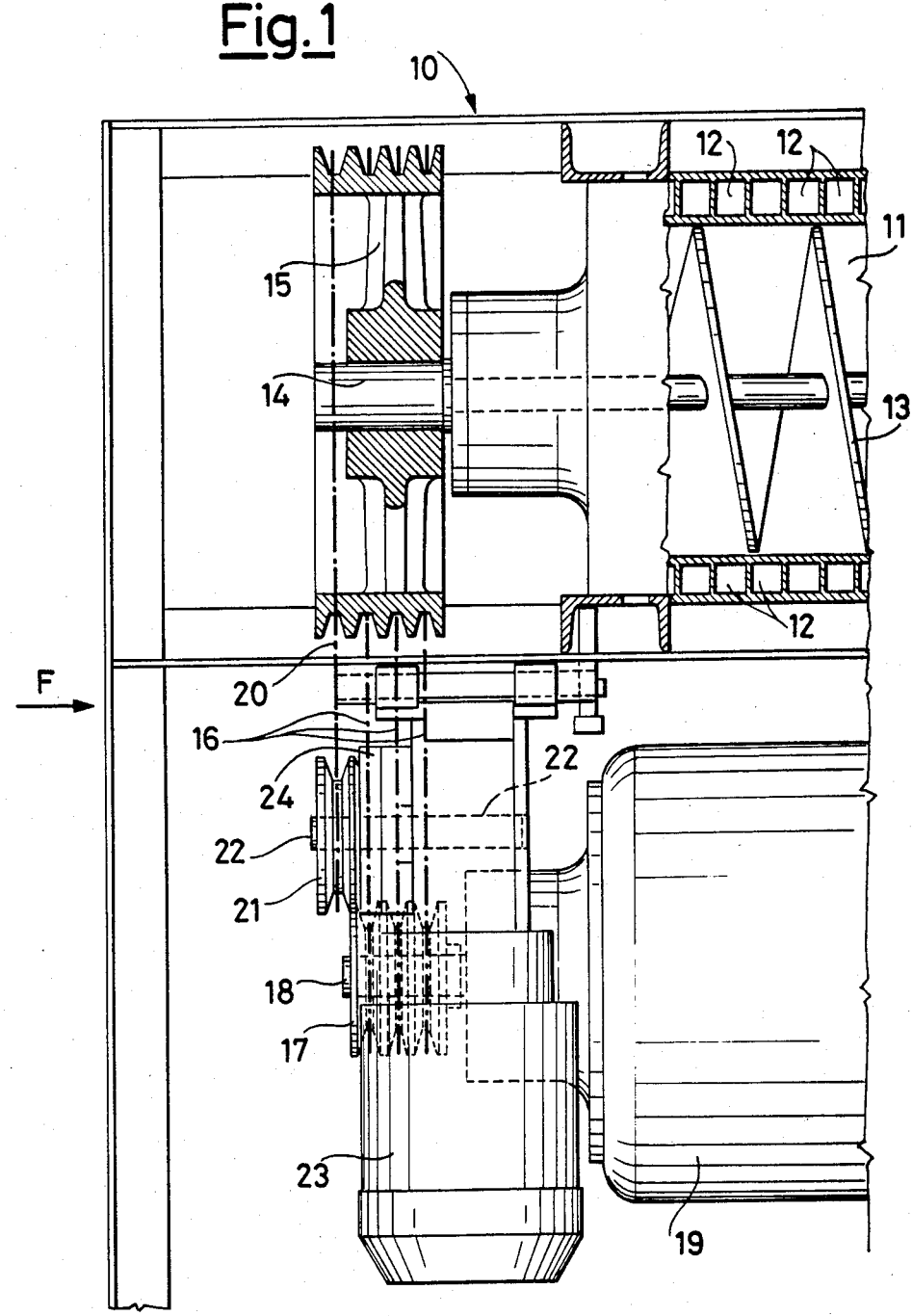

United States Patent [19]

Bravo

[11] Patent Number: 4,653,928
[45] Date of Patent: Mar. 31, 1987

[54] DUAL-PURPOSE MACHINE FOR MAKING ICE CREAM AND CRUSHED-ICE SYRUP DRINKS

[75] Inventor: Francesco Bravo, Montecchio Maggiore, Italy

[73] Assignee: Bravo S.p.A., Italy

[21] Appl. No.: 662,398

[22] Filed: Oct. 18, 1984

[30] Foreign Application Priority Data

Nov. 3, 1983 [IT] Italy ............................. 23448/83[U]

[51] Int. Cl.[4] .............................................. A23G 9/00
[52] U.S. Cl. ..................................... 366/149; 62/342; 366/601
[58] Field of Search ...................... 366/64, 67, 79, 196, 366/96–99, 241, 279, 249–251, 318, 349, 601; 62/342, 343

[56] References Cited

U.S. PATENT DOCUMENTS

| | | | |
|---|---|---|---|
| 2,142,879 | 1/1939 | Alexandrou | 366/251 |
| 3,937,522 | 2/1976 | Korn et al. | 366/196 X |
| 4,208,134 | 6/1980 | Whittle | 366/601 |

Primary Examiner—Timothy F. Simone
Attorney, Agent, or Firm—Shlesinger, Fitzsimmons & Shlesinger

[57] ABSTRACT

A dual-purpose machine for making icecream and crushed-ice syrup drinks essentially comprising a cylindrical whipping chamber within which rotates a mixer to one shaft of which are operationally connected motor means, characterized in that said motor means consist of a first and a second motor means which can be selectively operated to control the rotation of said mixer at a relatively high speed for the making of icecream and at a very low speed, of the order of a few RPM, for the making of crushed-ice syrup drinks.

2 Claims, 2 Drawing Figures

DUAL-PURPOSE MACHINE FOR MAKING ICE CREAM AND CRUSHED-ICE SYRUP DRINKS The present invention relates to a dual-purpose machine for the making at will of icecream or crushed-ice syrup drinks, in which the mixer is controlled to move in the whipping chamber by two separate motors which operate alternatively as required.

Icecream-making machines are known, as also so-called crushed-ice machines for making crushed-ice syrup drinks.

Both such machines comprise suitably refrigerated cylindrical containers within which rotate stirring members for emulsifying, stirring and mixing the cream in the former case, and for detaching, stirring and emulsifying ice-flakes with a syrup in the latter case.

The operating speed of the mixers must be higher for the making of icecream and considerably lower for the making of crushed-ice syrup drinks, i.e. a few rpm. For this reason two distinct machines are required.

The principal object of the present invention is to embody a single machine which will make, at will, either icecream or crushed-ice syrup drinks.

Another object of the invention is to embody a machine with the aforesaid characteristics of a kind that is relatively straightforward and economical to manufacture and at the same time extremely dependable in operation.

To achieve these objects, the present invention embodies a dual-purpose machine for making icecream and crushed-ice syrup drinks which essentially comprises a whipping chamber within which rotates a mixer to one shaft of which drive means are operationally connected, characterized in that said drive means consist of a first and second motor means which can be selectively operated to control the said mixer to rotate either at a high speed for the making of icecream or at a very low speed, of the order of a few RPM, for the making of crushed-ice syrup drinks.

Figure 2:
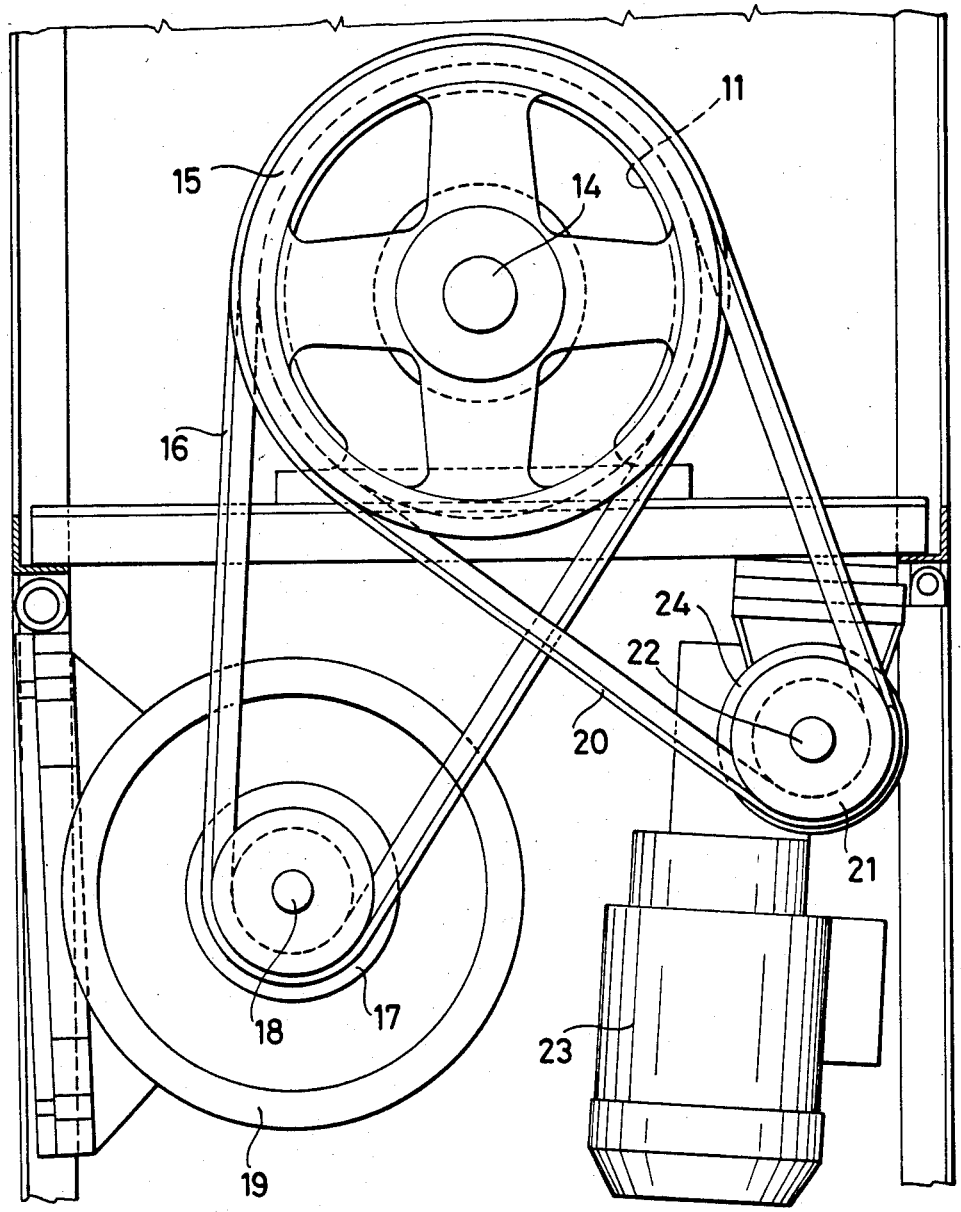

The structural and functional characteristics and the advantages of the dual-purpose machine according to the invention will be seen in greater detail from the following description, referred to the attached schematic drawings, in which:

FIG. 1 is a partially sectioned elevational view of a machine according to the invention; and FIG. 2 is an elevational view in the direction of the arrow F of FIG. 1.

With reference to the drawings, a dual-purpose machine for making ice-cream and crushed-ice syrup drinks according to the invention, indicated by 10, essentially comprises a cylindrical vessel 11 (so-called whipping chamber) provided with external refrigerating means 12, within which a mixing means 13 rotates. The mixing means 13 extends outside the whipping chamber in the form of a driven shaft 14 to which a sheave 15 is keyed. A series of belts 16 transmits drive to the shaft 14 of the mixer 13, receiving such drive from a sheave 17 keyed to the shaft 18 of a motor 19 operating preferably but not necessarily with alternating current.

Alternatively and selectively, a further belt 20 transmits the drive received from a pulley 21 operationally connected to the output shaft 22 of a geared motor 23 by a free-wheel 24 (unidirectional coupling).

The machine 10 structured and embodied according to the innovative concepts of the present invention operates in the manner described below.

If it is wished to make icecream, cream for icecream is placed into the whipping chamber 11. When the motor 19 is started, the relative pulley 17 commences to rotate and by means of the belts 16 transmits the drive to the pulley 15 and thus to the mixer 13.

The transmission ratio between the two pulleys 17 and 15, and the fact that the motor 19 is a 2-speed motor, permit the mixer 13 to perform a number of revolutions particularly suitable for the treatment of cream for making icecream.

By means of the belt 20, the pulley 15 also transmits the drive to the pulley 21 which, as a result of the presence of the free-wheel 24, rotates idly with respect to the shaft 22 of the geared motor 23, and the movement of the mixer 13 is therefore not in any way affected, as is also so for the electrical circuit of the machine.

If, alternatively, it is wished to make crushed-ice syrup drinks with the machine 10, the motor 19 is stopped and a suitable syrup is placed into the cleaned whipping chamber 11 and the geared motor 23 is started.

The geared motor 23 is so embodied as to transmit an extremely low number of revolutions to the shaft 14 of the mixer 13, in that the free-wheel 24 operationally connects the pulley 21 to the shaft 22, entraining the belt 20 and, in consequence, the pulley 15.

The belts 16 are entrained simultaneously and rotate the pulley 17 and the rotor of the motor 19.

The rotor rotation speed is therefore so low as again not in any way to affect the electrical circuit of the machine. The rotation speed of the mixer 13 within the whipping chamber 11 causes a slow mixing of the syrup and the ice-scales which form; this slow mixing amalgamates the syrup and the ice-scales, to produce a crushed-ice syrup drink.

Both the motors could also be d.c. motors, and in such case the motor 23 would not need to be a geared motor.

The illustrated arrangement of the two motor units within the machine and their operational connection is shown for purposes of exemplification only.

The two motor units could in fact also be arranged aligned on the same axis, in which case appropriate coupling means would be provided.

The very considerable advantage and the utility of a machine embodied according to the invention, which permits both icecream and crushed-ice syrup drinks to be produced, are evident.

I claim:

1. In a machine for making ice cream or crushed-ice syrup drinks, and having a cylindrical whipping chamber surrounded by refrigerating means and containing a rotatable mixer, which is secured to a first shaft which projects exteriorly of the chamber and is connected to first motor means, which is operable selectively to rotate said mixer at a first speed, the improvement characterized by a second, alternative motor means connected to said shaft exteriorly of said chamber, and operable only when said first motor means is not operating, to rotate said first shaft at a second speed different from said first speed, said first motor means being disposed, when operated, to rotate said mixer at a relatively high speed for the making of ice cream, and said second motor means being disposed, when operated, to rotate said mixer at a very low speed, on the order of a few RPM, for the making of crushed-ice syrup drinks, one of said first and second motor means including a unidirectional coupling device mounted to rotate freely on a second shaft, when the other of said first and second motor means is operated, and operative drivingly to connect said one of said first and second motor means to said first shaft, when said one motor means is operated.

2. A machine according to claim 1, characterized in that said first shaft has keyed to it externally of said chamber a sheave pulley operationally connected by belts to two pulleys one of which is releasably connected to said second shaft by said coupling device, and the other of which is keyed to a shaft that projects from said other of said first and second motor means.

* * * * *